May 21, 1935.  H. A. JOHNSON  2,001,877
VEHICLE BODY CONSTRUCTION
Filed Feb. 26, 1934  2 Sheets-Sheet 1
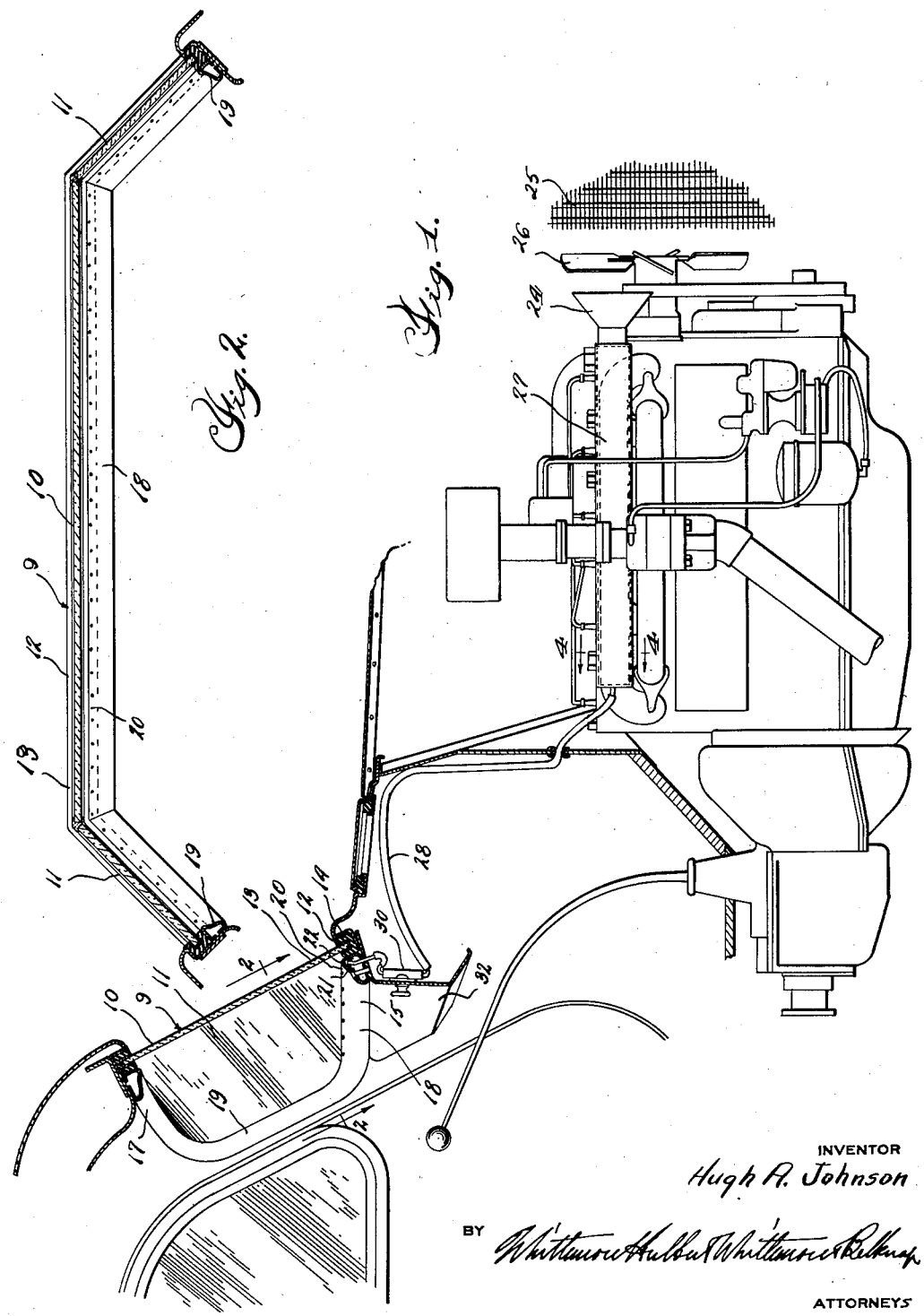
INVENTOR
Hugh A. Johnson
BY
ATTORNEYS May 21, 1935. H. A. JOHNSON 2,001,877
VEHICLE BODY CONSTRUCTION
Filed Feb. 23, 1934 2 Sheets-Sheet 2
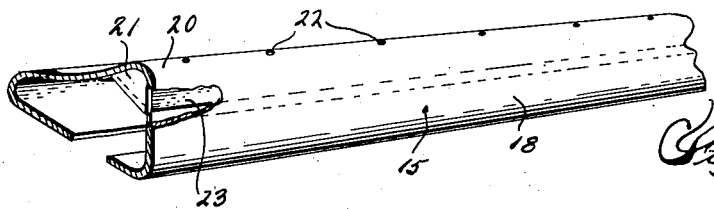
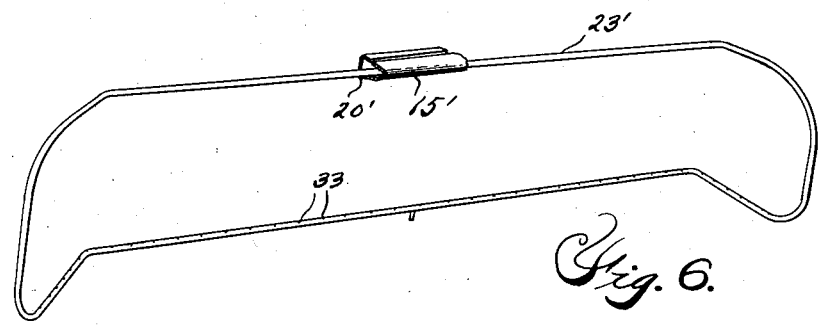
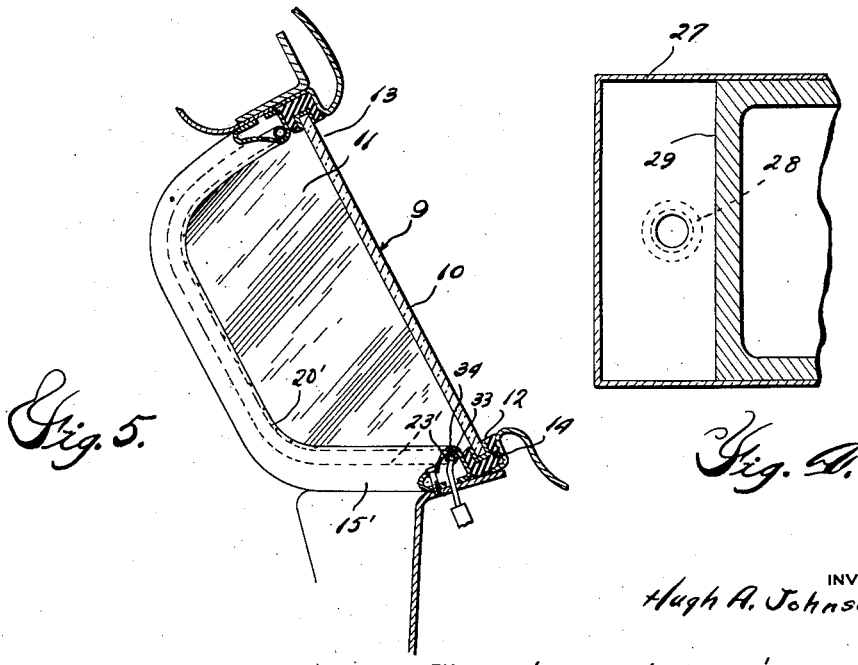
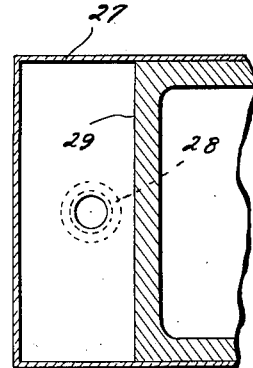
INVENTOR
Hugh A. Johnson
BY
ATTORNEYS Patented May 21, 1935

2,001,877

UNITED STATES PATENT OFFICE 2,001,877

VEHICLE BODY CONSTRUCTION

Hugh A. Johnson, Detroit, Mich., assignor to Hupp Motor Car Corporation, Detroit, Mich., a corporation of Virginia Application February 26, 1934, Serial No. 713,048

11 Claims. (Cl. 20—40.5)

This invention relates generally to motor vehicles and refers more particularly to an improved means for directing air against the inner side of the body windshield.

One of the principal objects of the present invention is to provide relatively simple and inexpensive means enabling air to be discharged against the inner side of a vehicle body windshield to prevent the accumulation of moisture or fog thereon.

Another object of the present invention resides in the provision of means of the type previously set forth having the additional function of preventing the accumulation of ice and snow upon the outer side of the windshield. This is accomplished in the present instance by preheating the air prior to discharging the same against the inner side of the windshield. In accordance with the present invention the air is preheated by causing the same to flow into heat conducting relation to the exhaust manifold of the engine during the passage of the air from the source of supply to the point of demand or to the windshield.

A further object of this invention resides in the provision of a molding at the inner side of the windshield for performing the dual function of securing the windshield in assembled relation with the body and of distributing air upon the inner surface of the windshield. In other words, the molding not only performs its usual function of securing the windshield in fixed relation to the body, but also acts as a manifold for distributing air upon the windshield.

The foregoing, as well as other objects, will be made more apparent as this description proceeds, especially when considered in connection with the accompanying drawings wherein:

Figure 1 is a longitudinal sectional view through a portion of a motor vehicle embodying my invention;

Figure 2 is a transverse sectional view taken on a plane indicated by the line 2—2 of Figure 1;

Figure 3 is a detailed perspective view of the air distributing manifold;

Figure 4 is a cross-sectional view taken on the line 4—4 of Figure 1;

Figure 5 is a view similar to Figure 1 showing a slightly modified form of construction;

Figure 6 is a diagrammatic perspective view illustrating the air distributing manifold employed in the modified construction shown in Figure 5.

Although the means about to be described for distributing air against the inner side of a windshield is not limited to any particular shape of windshield, nevertheless, this means finds particular utility when employed in association with windshields of the general type featured herein having relatively small angularly arranged end portions, due to the difficulty in properly cleaning these portions. The particular windshield 9 selected herein for the purpose of illustrating this invention is of the bay window type having a centrally arranged panel 10 extending transversely of the body in advance of the door pillars on opposite sides of the body and connected to these pillars by angularly disposed wing panels 11. As will be apparent from Figure 1 of the drawings, the several panels of the windshield 9 are secured within a unitary frame 12 insertable into the windshield opening 13 in the body in abutting relation to a flange or shoulder 14 on the body extending around the opening 13. The windshield frame is clamped to the flange 14 by means of molding 15 secured to the body within the opening 13 upon the inner side of the windshield frame 12 by means of screws 16 and having the outer side thereof engaging the inner side of the windshield frame 12.

The molding 15 is in the form of a frame simulating in shape the frame 12 for the windshield panels and is formed of top, bottom and side strips 17, 18, and 19 respectively. Each of the strips forming the molding frame 15 are substantially channel shaped in cross section and are assembled upon the body with the base portions thereof forming the inner sides of the frame and with the leg portions seated upon the body. In the specific embodiment of the invention shown in Figure 2, the outer edges of the channel strips aforesaid are fashioned to form a continuous inwardly extending bead 20 in the assembled relation of the strips and a partition 21 is secured within the channel of the lower strip 18 to seal the space within the bead 20 of this strip from the remaining space in the latter. The partition 21 is in the form of a sheet metal strip having the edges welded or otherwise suitably secured to the section of the molding 18 within the latter and the ends of the strip 21 extend beyond the opposite ends of the section 18 to permit the same to be bent upwardly in the manner shown in Figure 3 to seal the space within the bead of the section 18 from communication with the adjacent molding sections. The projecting ends of the strip 21 may be welded or otherwise suitably secured to the opposite edges of the bead 20 on the section 18 of the molding and the bead of this section is apertured at longitudinally spaced points, as indicated by the reference character 22, in such a manner that the space defined by the bead and strip 21 forms a manifold 23 for distributing fluid against the inner side of the windshield.

It has been previously stated that one of the principal objects of this invention is to direct air against the inner side of the windshield, and for accomplishing this result means is provided herein for conducting air from a point immediately in rear of the cooling fan of the vehicle to the manifold 23. As diagrammatically shown in Figure 1, air is conducted to the manifold 23 by a funnel 24 having the large diametered end located to receive air drawn through the radiator 25 by the fan 26 and having the opposite end communicating with a housing 27 which in turn communicates with the interior of the manifold 23 by a flexible conduit. As shown in Figure 4, one wall of the housing 27 is formed by the outer side of the usual exhaust manifold 29 so that the air passing through the housing will be heated by the exhaust manifold prior to being discharged into the manifold 23. With the foregoing construction, it will be apparent that a liberal quantity of air drawn through the radiator 25 by the fan 26 is collected by the funnel 24 and discharged into the housing 27. Inasmuch as one wall of this housing is formed by the exhaust manifold the air is, of course, heated as it passes through the housing into the manifold 23, and in view of the fact that the latter is apertured as at 22, this heated air will be distributed upon the inner side of the windshield. The air distributed upon the inner side of the windshield will remove any moisture or fog from the inner side of the windshield and although the air will accomplish this result whether heated or not I prefer to heat the same so as to obtain the additional result of preventing the accumulation of ice or snow upon the outer side of the windshield.

Inasmuch as it is not always desirable to distribute air upon the inner surface of the windshield, I provide means for controlling the passage of air into the manifold from the housing. This means comprises a valve 30 of any suitable construction located in the conduit 28 and controlled by means secured on the dash 32 of the vehicle in a position where it may be conveniently operated.

Thus from the foregoing it will be seen that I have provided a relatively simple system for removing any fog that may accumulate on the inner surface of the windshield and for preventing the accumulation of ice or snow upon the outer surface of the windshield. It will further be apparent that my improved system for accomplishing the above result may be installed in the minimum amount of time and is capable of being manufactured at an extremely low cost due to the fact that the distributing manifold is formed by the molding heretofore employed for the sole purpose of securing the windshield in assembled relation with the body.

Referring now more in detail to the modified form of the invention shown in Figures 5 and 6, it will be noted that this construction differs only from the one previously set forth in that the air distributing manifold 23' is formed by a tube located within the molding frame 15' and in that this manifold is coextensive with the molding frame 15'. In detail, the tube is welded or otherwise suitably secured within the continuous bead 20' of the molding frame and is provided with openings 33 adapted to register with corresponding openings 34 in the bead in order to provide for discharging the air admitted to the manifold against the inner side of the windshield. With this construction it will, of course, be apparent that air will be discharged upon the inner surface of the windshield from the top, bottom, and side strips of the molding. Preheated air may be admitted to the manifold or tube in the same manner as air is conducted to the manifold 23 in the first described form of the invention, and accordingly, the present embodiment, in addition to possessing certain of the advantages of the first described form of the invention has the further feature of discharging air against the windshield from all sides of the molding frame.

Although in describing the several embodiments of this invention particular stress has been placed upon the specific means employed for conducting preheated air to the manifold, it should be understood that various other arrangements may be resorted to for accomplishing this result, and accordingly, reservation is made to make such changes in the two forms of the invention featured herein as may come within the purview of the accompanying claims.

What I claim as my invention is:

1. In a motor vehicle having a body provided with a windshield opening having a shoulder at one side, a windshield within said opening engaging the inner side of the shoulder, means for holding the windshield in engagement with the shoulder including a molding fixed to the body at the inner side of the windshield in engagement with the latter and fashioned to receive air, means for discharging air into said molding and the latter having openings therethrough directed toward the inner surface of the windshield.

2. In a motor vehicle having a body provided with a windshield, a molding secured to the body at the inner side of the windshield in engagement with the windshield for holding the latter in assembled relation with the body and having openings therethrough directed toward the inner surface of the windshield, a distributing manifold housed within said molding and having openings therethrough registrable with the openings aforesaid in said manifold, and means for discharging air into the manifold.

3. In a motor vehicle having a body provided with a windshield, means for securing the windshield in place including a molding fixed to the body at the inner side of the windshield in engagement therewith and having openings therethrough directed toward the inner surface of the windshield, a distributing manifold housed within said molding and having openings therethrough registrable with the openings in said manifold, means for discharging air into the manifold, and means for heating said air prior to discharging the same into the manifold.

4. In a motor vehicle having a body provided with a windshield opening and having a shoulder at one side of the opening, a windshield positioned within the opening and abutting the inner side of the shoulder, means for holding the windshield in engagement with the shoulder including a molding fixed to the body at the inner side of the windshield in engagement with the latter and fashioned to receive air, means for conducting air into the molding and the latter having openings therethrough directed toward the inner surface of the windshield, and means for heating the air prior to conducting the same to the molding.

5. In a motor vehicle having a body provided with a windshield opening, a windshield disposed in the opening with the outer side of one marginal edge in abutting relation to a portion of the body structure, means for holding the windshield in engagement with the portion aforesaid of the structure including a molding fixed to the body at the inner side of the windshield in engagement with the latter and fashioned to receive air, and means for conducting air into the molding and the latter having openings therethrough directed toward the inner surface of the windshield.

6. In a motor vehicle having a body provided with a windshield opening and having a shoulder surrounding the opening, a windshield for the opening abutting the inner side of the shoulder, means for holding the windshield into engagement with the shoulder including a molding frame secured to the body at the inner side of the windshield for engagement therewith and having a portion at one side of the windshield fashioned to receive air, said portion having openings therethrough directed toward the inner surface of the windshield, and means for discharging air into the portion aforesaid of the molding.

7. In a motor vehicle having a body provided with a windshield opening and having a shoulder surrounding the windshield opening, a windshield for the opening engaging the inner side of the shoulder, means for holding the windshield into engagement with the shoulder including a molding frame of hollow cross section fixed to the body at the inner side of the windshield in engagement with the latter and having a portion sealed from the remaining portion thereof, said sealed portion having openings therethrough directed toward the inner surface of the windshield, and means for discharging air into the sealed portion.

8. In a motor vehicle having a body provided with a windshield opening and having a shoulder surrounding the opening, a windshield for the opening engaging the inner side of the shoulder, means for holding the windshield into engagement with the shoulder including a molding fixed to the body at the inner side of the windshield in engagement with the latter and having a hollow bead extending longitudinally thereof adjacent the inner side of the windshield, said bead having openings therethrough directed toward the inner side of the windshield, and means for discharging air into the bead.

9. In a motor vehicle having a body provided with a windshield, a molding of hollow cross section secured to the body at the inner side of the windshield, a strip housed within a portion of the molding and having the marginal edges secured to opposite side walls of the molding forming an air distributing manifold, said manifold having openings directed toward the inner side of the windshield, and means for discharging air into the manifold.

10. In a motor vehicle having a body provided with a windshield, a molding of hollow cross section secured to the body at the inner side of the windshield and having a longitudinally extending bead adjacent the inner surface of the windshield, a strip housed within the molding cooperating with the bead to form an air distributing manifold of restricted cross sectional area and having end walls sealing the restricted area from the remainder of the molding, means for discharging air into the distributing manifold thus formed, and outlet openings for the air in the manifold directed toward the inner surface of the windshield.

11. In a motor vehicle having a body provided with a windshield opening and having a shoulder surrounding the windshield opening, a windshield within the opening engaging the inner side of the shoulder, means for holding the windshield into firm engagement with the shoulder including a molding frame fixed to the body at the inner side of the windshield in engagement with the latter and having a portion of hollow cross section provided with a bead located adjacent the inner surface of the windshield, a strip housed within the hollow portion of the molding and cooperating with the bead to form an air distributing manifold of restricted cross sectional area, means for discharging air into the manifold and the latter having outlet openings through one wall thereof directed toward the inner surface of the windshield.

HUGH A. JOHNSON.